Oct. 5, 1954

J. J. BATCHA 2,690,689

FLEXIBLE DRIVE MEANS FOR SOCKET WRENCHES

Filed Oct. 29, 1952

INVENTOR.
JOHN J. BATCHA
BY
*Whittemore, Hulbert & Belknap*
ATTORNEYS

Patented Oct. 5, 1954

2,690,689

UNITED STATES PATENT OFFICE 2,690,689

FLEXIBLE DRIVE MEANS FOR SOCKET WRENCHES

John J. Batcha, Detroit, Mich.

Application October 29, 1952, Serial No. 317,446

4 Claims. (Cl. 81—57)

This invention relates to wrenches of the type used to manipulate studs or nuts and refers more particularly to improvements in speed wrenches.

It is an object of this invention to provide a wrench having means for operating the driver at an exceptionally high rate of speed to tighten or remove a nut or stud and also having provision for applying additional torque to the driver in the event further tightening of the stud or nut is required or in the event the torque obtainable by the high speed means is not sufficient to loosen a stud or nut.

It is another object of this invention to provide a compact speed type wrench composed of a relatively few simple parts capable of being inexpensively manufactured and assembled.

The foregoing as well as other objects will be made more apparent as this description proceeds especially when considered in connection with the accompanying drawing wherein.

Figure 1:
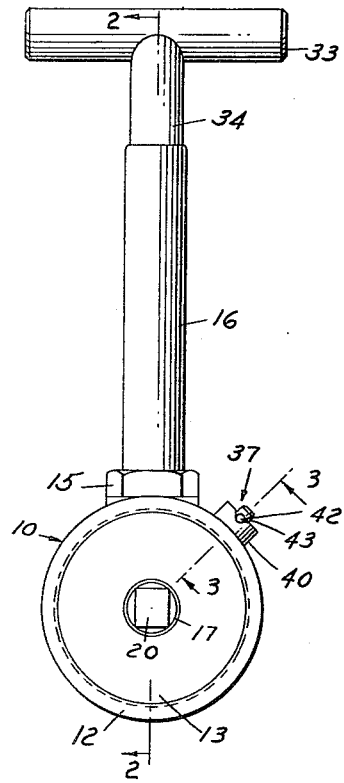
Figure 1 is an end elevational view of a speed wrench embodying the features of this invention.

The wrench selected herein for the purpose of illustration comprises a housing 10 and ratchet mechanism 11 supported within the housing. The housing 10 comprises a tubular member 12 having the opposite ends closed by caps in the form of discs 13 and having an opening 14 extending through one side thereof midway between the caps 13. The caps 13 are removably secured to opposite ends of the tubular member 12 and in the present instance are shown as having a threaded engagement with the tubular member 12 although it will be understood that various other methods of attachment may be employed.

A nut 15 is welded, brazed or otherwise permanently secured to the outer surface of the tubular member 12 with the threaded bore in the nut aligned with the opening 14. If desired, the opening 14 may be internally threaded to form in effect an extension of the threaded bore in the nut 15. In any case, a tubular handle part 16 extends radially outwardly from the housing 10 and has the inner end threaded into the nut 15.

Figure 2:
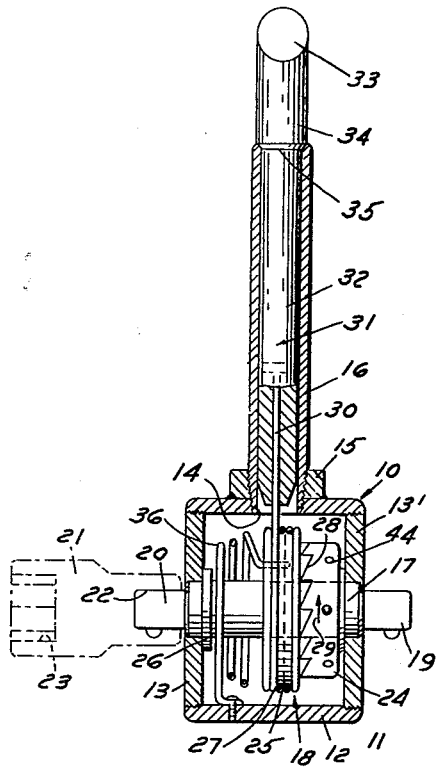
Figure 2 is a sectional view taken on the line 2—2 of Fig. 1.

The ratchet mechanism 11 comprises a shaft 17 and a clutch 18. The shaft 17 is journalled in aligned openings formed in the caps 13 and has polygonally shaped driving portions 19 and 20 at opposite ends thereof. The driving portions respectively project beyond the closure caps 13 of the housing and are adapted to be alternately attached to a conventional driving socket 21 which is shown in Figure 2 of the drawing as attached to the shaft portion 19. As pointed out above the socket 21 is of conventional design and has a polygonally shaped opening 22 at one end for slidably receiving either of the portions 19 and 20 on the shaft 17, and has a recess 23 at the opposite end shaped to engage a nut or the head of a stud to be manipulated.

The clutch 18 comprises cooperating members 24 and 25. The clutch member 24 is pinned or otherwise secured to the shaft 17 within the housing in a position to abut the axially inner surface of the adjacent closure cap 13' in order to prevent axial displacement of the shaft 17 in a direction toward the latter cap 13'. Axial displacement of the shaft 17 in the opposite direction is prevented by an annular shoulder 26 formed on the shaft in a position to abut the inner surface of the other closure cap 13. The clutch member 25 is rotatably supported on the shaft 17 at the axially inner side of the clutch member 24 and a recess 27 is formed in the periphery of the clutch member 25 for reasons to be more fully hereinafter described. The adjacent surfaces of the clutch members are provided with a multiplicity of ratchet teeth 28 which are fashioned to engage one another upon rotation of the clutch member 25 in the direction of the arrow 29 in Figure 2, and impart a driving thrust to the shaft 17 through the cooperating clutch member 24. On the other hand, rotation of the clutch member 25 in the opposite direction causes the teeth 28 on the clutch member 24 to cam the clutch member 25 axially away from the clutch member 24 and thereby permit free rotation of the clutch member 25 relative to the shaft 17.

The clutch member 25 is rotated in the direction of the arrow 29 to impart rotation to the driving shaft 17 by a flexible linear member in the form of a cable 30. One end portion of the cable 30 is reeved around the bottom wall of the recess 27 in the periphery of the clutch member 25 and is suitably secured to the latter clutch member. The other end portion of the cable 30 extends outwardly into the tubular handle part 16 and is permanently secured to an operating member 31. The operating member 31 has an elongated shank 32 slidably supported within the tubular handle part 16 and has a T-shaped portion 33 at the outer end thereof. The stem 34 of the T-shaped portion is of enlarged diameter to provide a shoulder 35 for engagement with the outer end of the tubular handle part 16 and the head of the T-shaped portion serves as a grip by means of which the member 31 may be operated.

It follows from the foregoing that outward movement of the operating member 31 relative to the handle part 16 rotates the clutch member 25 in the direction of the arrow 29 and, through the ratchet teeth 28, imparts a corresponding rotation to the drive shaft 17. When the outward pull applied to the operating member 31 is discontinued it is necessary to rewind the cable 30 around the clutch member 25 and this is accomplished by a helical spring 36 surrounding the shaft 17 within the housing 10. As shown in Figure 2 of the drawing, one end of the spring is secured to the housing and the other end of the spring is secured to the clutch member 25. The arrangement is such that the spring normally urges rotation of the clutch member 25 in a direction opposite the direction of the arrow 29 and the strength of the spring is sufficient to rewind the cable 30 on the clutch member 25 when the outward pull applied to the operating member 31 is released.

Assuming that the socket 21 is in the position thereof shown in Figure 2 of the drawing and that the clutch member 25 is rotated in the direction of the arrow 29 by the operating member 31, it will be noted that the socket 21 is driven in a corresponding direction to tighten the fastener engaged by the socket 21. In the event it is desired to loosen the fastener, the socket 21 is assembled on the opposite end of the shaft 17 so that the fastener is rotated in the other direction. Thus it is apparent that the wrench operates at an exceptionally high rate of speed to either tighten or remove a fastener element.

Figure 3:
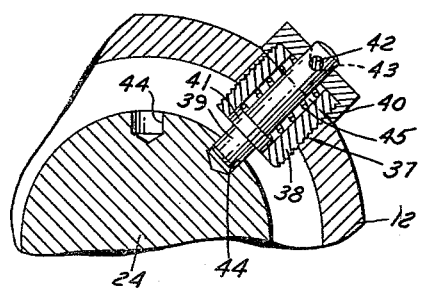
Figure 3 is a sectional view taken on the line 3—3 of Fig. 1.

In some instances, it may be desired to apply greater torque to the socket 21 in order to either more securely tighten a fastener in place or to loosen a fastener. In order to accomplish this result a detent 37 is secured to the tubular member 11 of the housing at one side of the latter. As shown in Figure 3 the detent 37 comprises essentially a bushing 38 and a plunger 39. The bushing 38 is threaded or otherwise suitably secured to the tubular part 12 with its axis extending radially and the outer end of the bushing is closed by a cap 40 which is threaded on the bushing. The plunger 39 has an enlargement 41 slidably engageable with the inner surface of the bushing 38 and the outer end of the plunger projects through an opening in the cap 40. A pin 42 extends transversely through the outer end of the plunger 39 and seats within a recess 43 formed in the cap 40. The inner end of the plunger 39 projects beyond the enlargement 41 and selectively engages within recesses 44 formed in the periphery of the clutch member 24 in circumferentially spaced relationship. The plunger is normally urged in a radially inward direction by a coil spring 45 surrounding the plunger within the bushing and having the opposite ends respectively engaging the cap 40 and the enlargement 41.

When the pin 42 is seated in the recess 43 in the cap 40, the radially inner end of the plunger 39 extends into one of the recesses 44 in the clutch member 24. Thus the clutch member 24 is held against rotation relative to the housing 10 so that rotation of the housing 10 in the direction of the arrow 29 by the handle part 16 causes the ratchet teeth 28 on the clutch member 24 to rotate the shaft 17 in a corresponding direction through the clutch member 24. Since the handle part 16 is of substantial length it follows that considerable torque may be applied to the socket 21 to either tighten or loosen a fastener element.

The detent 37 may be readily manipulated to release the plunger 39 from engagement with the clutch member 24 by merely shifting the plunger 39 radially outwardly against the action of the spring 45 and then turning the plunger through approximately 90° in order to locate the pin 42 crosswise of the recess 43. When in the above position the extremities of the pin 42 rest on the outer surface of the cap 40 and the inner end of the plunger 39 is positioned radially outwardly beyond the periphery of the clutch member 24 so as not to interfere with rotation of the latter by the cable 30.

What I claim as my invention is:

1. A speed wrench comprising a support having a body part, a shaft journalled on said body part and having provision at opposite ends for selectively attaching a driving socket thereto, a clutch comprising a first member fixed to said shaft, a second member freely rotatably supported on said shaft and slidable axially thereof, cooperating ratchet teeth on adjacent faces of said members shaped to drive the first member upon rotation of the second member in one direction and to permit rotation of the second member in the opposite direction relative to the first member, a spring for biasing the second member in said opposite direction, operating means connected to said second member for rotating the latter in said one direction against the action of said spring, and selectively operable means for holding the shaft against rotation in the said opposite direction relative to the body part.

2. A speed wrench as defined in claim 1, in which said selectively operable means is selectively operative to hold the shaft against rotation in either direction relative to the body part and comprises a detent supported on the body part for sliding movement into and out of a recess in the first clutch member.

3. A speed wrench comprising a housing having side and end walls, a tubular handle part projecting laterally from the side wall, a shaft extending through said housing being journalled on the end walls and having its opposite ends projecting through said end walls for attachment to a driving socket, a clutch comprising a first member fixed to the shaft within the housing, a second member freely rotatably mounted on the shaft within the housing and slidable along said shaft, cooperating ratchet teeth on adjacent faces of the members shaped to drive the first member upon rotation of the second member in one direction and to permit rotation of the second member in the opposite direction relative to the first member, a spring supported within the housing and engageable with the second member to urge the latter in said opposite direction, an operator having a part slidably supported in the tubular handle part and having a hand gripping portion beyond the outer end of the tubular handle part, a flexible linear member secured to said operator and reeved around the second member and secured to the latter, and selectively operable means for holding the shaft against rotation in either direction relative to the body part, said selectively operable means comprising a bushing supported on one of the walls of the housing, a plurality of recesses in the first clutch member arranged in circumferentially spaced relation with respect thereto, and a plunger supported in said bushing for sliding movement into and out of the recesses.

4. A speed wrench as defined in claim 3 having a spring urging the plunger toward the recesses, and means providing a shoulder fixed with respect to the housing for supporting the plunger in retracted position out of the recesses.

References Cited in the file of this patent

UNITED STATES PATENTS

| Number | Name | Date |
|---|---|---|
| 1,306,553 | Morrison | June 10, 1919 |
| 2,290,197 | Merriman et al. | July 21, 1942 |
| 2,365,839 | Pike | Dec. 26, 1944 |
| 2,530,553 | Strobell | Nov. 21, 1950 |
| 2,603,996 | Schellenger | July 22, 1952 |
| 2,603,998 | Schwartz | July 22, 1952 |
| 2,633,044 | Pasquariello | Mar. 31, 1953 |